US012716491B2

(12) United States Patent
Goupil et al.

(10) Patent No.: US 12,716,491 B2
(45) Date of Patent: Aug. 25, 2026

(54) DEFORMABLE SEALING PLUG AND PROCESS FOR PLUGGING A CAVITY USING SUCH A SEALING PLUG

(71) Applicant: Airbus Operations SAS, Toulouse (FR)

(72) Inventors: Frédéric Goupil, Toulouse (FR); Ghislain Viauvy, Toulouse (FR); Vincent Fauchille, Toulouse (FR); Caroline Le, Toulouse (FR); François Bignebat, Toulouse (FR); Nicolas Garres, Toulouse (FR); Adrien Gelle, Toulouse (FR); Antoine Mercier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/896,130

(22) Filed: Sep. 25, 2024

(65) Prior Publication Data

US 2025/0100714 A1 Mar. 27, 2025

(30) Foreign Application Priority Data

Sep. 27, 2023 (FR) ...................................... 2310273

(51) Int. Cl.
*F16J 13/14* (2006.01)

(52) U.S. Cl.
CPC .................................... *F16J 13/14* (2013.01)

(58) Field of Classification Search
CPC .. F16J 13/14; F16J 13/00; B62D 25/24; F16L 55/132
See application file for complete search history.

(56) References Cited

U.S. PATENT DOCUMENTS

| | | | | |
|---|---|---|---|---|
| 2,843,154 A | | 7/1958 | Hosking | |
| 3,240,379 A | | 3/1966 | Bremer et al. | |
| 3,444,898 A | * | 5/1969 | Caple | F16L 55/1125 220/235 |
| 4,063,582 A | * | 12/1977 | Fischer | F16B 13/141 264/261 |
| 5,119,861 A | * | 6/1992 | Pino | G01M 3/2823 138/93 |
| 6,182,755 B1 | * | 2/2001 | Mansure | F16J 15/028 277/340 |
| 8,439,220 B2 | | 5/2013 | Norman et al. | |
| 9,108,133 B1 | * | 8/2015 | Tsubokawa | B01D 46/0005 |

(Continued)

OTHER PUBLICATIONS

French Search Report for corresponding French Patent Application No. 2310273 dated Mar. 28, 2024.

(Continued)

*Primary Examiner* — Eugene G Byrd
(74) *Attorney, Agent, or Firm* — Greer, Burns & Crain, Ltd.

(57) ABSTRACT

A sealing plug for leaktightly plugging a cavity. The sealing plug comprises an incompressibly deformable envelope delimiting a hollow internal space and provided with at least one orifice, a rod which can slide through the envelope, a first end of the rod that is provided with a head being able to deform the envelope when a second end of the rod is pulled, and a viscous seal arranged in the internal space of the envelope so as to be expelled from the envelope through the orifice when the envelope is deformed.

6 Claims, 6 Drawing Sheets

(56) References Cited

U.S. PATENT DOCUMENTS

| | | | | |
|---|---|---|---|---|
| 9,140,095 | B2 * | 9/2015 | Northam | E21B 33/1208 |
| 10,214,923 | B2 * | 2/2019 | Elduayen Madariaga | F16B 19/008 |
| 10,597,199 | B1 * | 3/2020 | Manning | B65D 59/02 |
| 10,995,858 | B2 * | 5/2021 | Nowatari | F16J 15/185 |
| 2002/0088768 | A1 * | 7/2002 | Turnwald | B65D 39/12<br>215/360 |
| 2009/0120940 | A1 * | 5/2009 | Shah | F16J 13/12<br>220/363 |
| 2011/0252971 | A1 * | 10/2011 | Ono | H05K 5/0216<br>96/4 |
| 2013/0199651 | A1 * | 8/2013 | Bowie | F16L 55/132<br>138/93 |

OTHER PUBLICATIONS

European Search Report for corresponding European Patent Application No. 24198229 dated Sep. 6, 2024.

* cited by examiner

AC
33
35
34
32

DEFORMABLE SEALING PLUG AND PROCESS FOR PLUGGING A CAVITY USING SUCH A SEALING PLUG

CROSS-REFERENCES TO RELATED APPLICATIONS

This application claims the benefit of French Patent Application Number 2310273 filed on Sep. 27, 2023, the entire disclosure of which is incorporated herein by way of reference.

FIELD OF THE INVENTION

The present invention relates to a deformable sealing plug and to a process for plugging a cavity using such a sealing plug, in particular a cavity in a primary structure of an aircraft such as a wing box.

BACKGROUND OF THE INVENTION

In numerous technical fields, the manufacture of structures involves the assembly of multiple parts, between which there may be spaces or cavities. These cavities can be problematic and may need to be plugged, in particular within the context of applications requiring leaktight structures.

For example, in the aeronautical field, the wings of an aircraft have a primary structure, referred to as wing box, comprising complex assemblies of multiple metal panels. In particular at the base of the wings, which is to say at the connection between the wing box and the central box of the aircraft, the overlap of certain panels creates relatively wide chimney-like cavities with irregular cross sections. These cavities absolutely must be plugged leaktightly insofar as they provide a channel for communication between the inside and the outside of the wing box, and the latter is used as a fuel tank.

One known method for plugging this type of cavity consists in injecting a sealant mastic containing foam particles into the cavity. However, this method is not entirely satisfactory in terms of ergonomics and implementation. This is because this method can require access on either side of the cavity, and this is problematic in confined spaces, and also a considerable injection pressure, and therefore bulky tools, if the cavity to be plugged is very wide or very deep.

In addition, in the context of the particular application to the wing box, the sealant mastic must be injected from the inside of said wing box in order to ensure certain requirements are met. The internal space of the wing box is cramped and difficult to access, and this makes the operation lengthy and awkward, notably owing to the preparation steps (specifically plugging all the ancillary spaces to ensure that the sealant mastic penetrates the cavity correctly).

Since the (vertical) size of the wings is a factor directly linked to aircraft performance, the intention is to reduce this size in future, resulting in even narrower wing boxes. It is therefore important to find new solutions for facilitating the operations that concern the plugging of the aforesaid cavities.

SUMMARY OF THE INVENTION

The aim of the present invention is to rectify the above-mentioned drawbacks. It relates to a sealing plug intended to be arranged inside a cavity in order to plug said cavity leaktightly.

According to the invention, said sealing plug comprises at least:

- an envelope configured to be able to be deformed incompressibly, the envelope delimiting a hollow internal space and being provided with at least one orifice capable of making said internal space communicate with the outside of the envelope;
- a rod which can slide through the envelope and extends on either side of said envelope, the rod comprising a first end provided with a head able to exert a compressive force on the envelope in order to deform it when a second end of the rod is moved so as to pull the head against the envelope; and
- a viscous seal arranged in the internal space of the envelope, the sealing plug being configured such that the viscous seal is at least partially expelled from the envelope through the one or more orifices when the envelope is deformed by the head of the rod.

As a result, the invention provides a sealing plug able to easily and quickly plug cavities of various shapes and/or sizes leaktightly, it being possible for the sealing plug to be positioned very simply in the cavity to be plugged and for the leaktightness to be obtained by simply pulling on the rod which deforms the envelope and expels the viscous seal, the envelope thus deformed and the viscous seal thus expelled filling the cavity so as to hermetically plug it.

Advantageously, the head of the rod has a trapezoidal shape, the head being arranged such that the small base of the trapezoidal shape comes into contact with the envelope when the second end of the rod is moved so as to pull the head against said envelope.

In addition, advantageously, the envelope is provided with an opening for accessing the internal space and the sealing plug comprises a rigid cover configured to close said opening.

In a particular embodiment, the sealing plug comprises a non-return part arranged on the rod, in the internal space of the envelope and extending transversely with respect to the rod, the non-return part being configured to guide the viscous seal toward the one or more orifices in the envelope when said envelope is deformed, and to prevent the viscous seal from backing up into the internal space.

The viscous seal preferably corresponds to a sealant mastic which is polymerizable at ambient temperature.

In a particular embodiment, the envelope has an elongate parallelepipedal shape comprising a lateral wall in which the one or more orifices are made, and comprising a wall at each of its longitudinal ends between which the rod extends and through which it passes, the head of the rod being capable of coming into contact with one of said walls so as to deform the envelope.

The present invention also relates to a structure provided with at least one cavity. According to the invention, the structure comprises at least one sealing plug as described above, the sealing plug being arranged in the cavity so as to plug said cavity leaktightly.

The present invention also relates to a process for plugging a cavity using a sealing plug as described above.

According to the invention, said process comprises at least the following steps implemented in succession:

- a positioning step for inserting the sealing plug into the cavity to be plugged such that the second end of the rod is accessible from outside the cavity;
- a deformation step for moving the second end of the rod so as to pull the head against the envelope and exert a compressive force to deform said envelope until the envelope at least partially plugs the cavity and at least some of the viscous seal is expelled from the envelope through the one or more orifices; and a polymerization step for allowing the viscous seal expelled from the envelope during the deformation step to polymerize so as to obtain complete leaktightness of the cavity.

In addition, advantageously, the process comprises a preliminary step, implemented before the positioning step, for injecting the viscous seal into the internal space of the envelope.

In a particular embodiment, during the deformation step, the second end of the rod is moved by being pulled using a pulling tool capable of supplying a predefined pulling force.

In addition, advantageously, the process comprises an intermediate step, implemented after the positioning step and before the deformation step, for placing at least one intermediate part in the cavity such that a first end of the intermediate part makes contact with the sealing plug inside the cavity and such that a second end of the intermediate part protrudes out of said cavity, the second end of the rod being pulled by making contact with the second end of the intermediate part.

BRIEF DESCRIPTION OF THE DRAWINGS

The appended figures will make it easy to understand how the invention may be implemented. In these figures, identical reference signs denote similar elements.

DETAILED DESCRIPTION OF THE PREFERRED EMBODIMENTS

Figure 1:
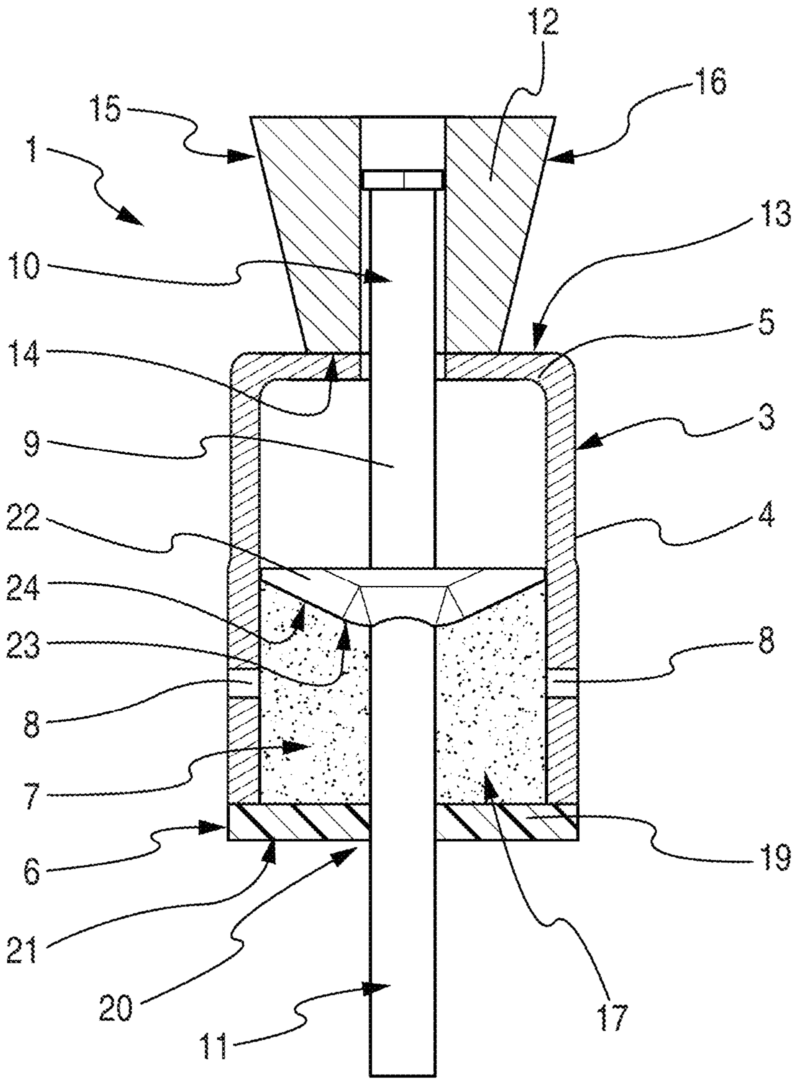
FIG. 1 is a view in section through a preferred embodiment of a sealing plug.

The sealing plug 1 (hereinafter plug 1) for illustrating the invention is shown schematically in FIG. 1 in a preferred embodiment. It is a deformable plug intended to be positioned in a cavity and be deformed there so as to closely match the shapes of this cavity in order to plug it hermetically. The features of the plug 1, which are described below in the description, allow it to remain in place in the cavity in its deformed shape and thus ensure leaktightness.

Without limitation, the cavity 2 may correspond to an orifice or a hole made in a structure comprising one or more parts. For example, such a structure may correspond to an assembly of multiple sub-units between which there is a space which forms the cavity 2.

One implementation example of the plug 1 for plugging a cavity 2 is shown schematically in FIG. 2A to FIG. 2D. In a preferred, non-limiting application, shown in FIG. 3 to FIG. 6, the cavity 2 corresponds to a chimney-like cavity between a wing box 34 and a central box 35 of an aircraft AC. However, the plug 1 is very flexible to use, allowing it to be suitable for numerous fields of application and in particular for cavities of various shapes and sizes.

In a preferred embodiment, shown in FIG. 1, the plug 1 comprises an envelope 3 having a substantially elongate parallelepipedal shape. The envelope 3 comprises a lateral wall 4 and walls 5 and 6 at its longitudinal ends. The envelope 3 corresponds to a deformable body, the walls 4, 5 and 6 of which delimit a closed chamber forming a hollow internal space 7.

A "deformable body" is understood to mean a body which is stiff enough to stay in a well-defined shape when at rest while still being elastic enough to be able to be deformed under the action of an external force. The envelope 3 is, notably, configured to be able to be deformed so as to match the shape of the cavity 2 intended to be plugged by the plug 1. In addition, the envelope 3 is configured to be deformed incompressibly. With preference, the envelope 3 corresponds to a vulcanized elastomer which has functional features (elasticity, strength, etc.) that are stable in the range of temperatures to which the wings of aircraft are usually exposed.

In addition, the envelope 3 is provided with orifices 8 made in the lateral wall 4. The orifices 8 correspond to through-holes of reduced size which are capable of making the internal space 7 communicate with the outside of the envelope 3. In the embodiment in FIG. 1, the envelope 3 is provided with two orifices 8. However, in other embodiments, it may have a single orifice 8 or more than two orifices 8.

Furthermore, the plug 1 has a rod 9 which can slide through the envelope 3. More specifically, the rod 9 is arranged along the longitudinal direction of the envelope 3 and extends on either side of the latter, through the walls 5 and 6. The rod 9 comprises a first end 10 which passes through the wall 5 and a second end 11 which passes through the wall 6. The end 10 of the rod 9 is provided with a head 12 capable of coming into contact with an external face 13 of the wall 5. The end 11 of the rod 9 is intended to be moved so as to pull the head 12 against the face 13 in order to exert a compressive force on the wall 5 of the envelope 3. To do this, the plug 1 is configured such that, once it is positioned in the cavity 2, the end 11 of the rod 9 is accessible from outside the cavity 2. The end 11 of the rod 9 preferably has a length designed to protrude out of the cavity 2.

Thus, acting on the rod 9 (by pulling it) makes it possible to compress the envelope 3 so as to deform it in order to plug the cavity 2, as explained in an implementation example below. Since the envelope 3 is composed of an incompressible material, it deforms until it takes up most of the lateral space between the head 12 and the walls of the cavity 2. In addition, the head 12 of the rod 9 has a shape designed to contribute to holding the envelope 3 in place in the cavity 2, once it has deformed.

In the embodiment in FIG. 1, the head 12 corresponds to an added part fixed securely to the end 10 of the rod 9. In this nonlimiting embodiment, the head 12 has a cross section of trapezoidal shape in the sectional plane in FIG. 1. The head 12 is arranged on the rod 9 such that one face 14, corresponding to the small base of the trapezoidal shape, makes contact with the face 13 of the envelope 3 when the head 12 is pulled against the wall 5. The head 12 thus arranged has inclined faces 15 and 16 corresponding to the non-parallel sides of the trapezoidal shape, which are oriented so as to be conducive to holding the envelope 3 in place in the cavity 2, once it has deformed.

The rod 9 may correspond to any type of elongate element capable of being pulled so as to press and pull the head 12 against the envelope 3 in order to deform it. The rod 9 may, notably, have a rough portion (not shown) at its end 11 to make it easier to pull. The rod 9 preferably corresponds to a flexible tab, specifically a tab with at least one flexible end 11. Such a flexible tab makes it easier to insert the plug 1 into the cavity 2 and to pull the end 11. Specifically, by virtue of the elasticity of the envelope 3 and the flexibility of the rod 9, the plug 1 can be inserted more easily into cavities that are difficult to access (as in the example shown in FIG. 5 and FIG. 6). In addition, the flexible end 11 can be curved so as to protrude out of the cavity 2 at an angle suitable for pulling the rod 9 (as shown in FIG. 6).

Furthermore, the plug 1 has a viscous seal 17 arranged in the internal space 7 of the envelope 3. The viscous seal 17 corresponds to a product based on at least one polymer which is capable of polymerizing in contact with oxygen at ambient temperature so as to form an element of the elastomer type, making it possible to ensure leaktightness. "Viscous" is understood to mean that the viscous seal 17, in its non-polymerized form, has a relatively fluid or pasty texture such that it is capable of being spread or dispersed without otherwise being liquid. For example, the viscous seal 17 may correspond to a packing mastic of the "PR" type, which is conventional in the aeronautical field. It preferably adheres strongly to metals.

The plug 1 is configured such that the viscous seal 17 is at least partially expelled from the envelope 3 through the orifices 8 when the envelope 3 is deformed by the compressive force obtained by pulling the rod 9. Since the viscous seal 17 is relatively fluid, it is capable of expanding in the cavity 2 as it is expelled and as the envelope 3 is deformed by pulling the rod 9.

Thus, not only does the envelope 3 match the shape of the cavity 2 by deforming, but also the viscous seal 17 expands through the lateral wall 4 (via the orifices 8) of the envelope 3 so as to fill the cavity 2. The viscous seal 17 is, notably, capable of filling gaps and small cavities that can form between the walls of the cavity 2 and the envelope 3 when said envelope 3 is deforming. In this way, the envelope 3 and the viscous seal 17 entirely fill the cavity 2 so as to plug it completely leaktightly.

Moreover, by polymerizing in the cavity 2, the viscous seal 17 makes it possible to consolidate the plug 1 by contributing to holding the envelope 3 in place in its deformed shape.

Thus, the plug 1 makes it possible to easily and quickly plug cavities of various shapes and sizes leaktightly. For the one part, the plug 1 may be positioned very simply in the cavity 2 to be plugged. For the other part, the leaktightness can be obtained by simply pulling on the rod 9, from outside the cavity 2, making it possible to deform the envelope 3 and to expel the viscous seal 17 out of the envelope 3. The envelope 3 thus deformed and the viscous seal 17 thus expelled entirely and hermetically fill the cavity 2.

In addition, in a particular embodiment, the envelope 3 is provided with an opening 18 for accessing the internal space 7. In the embodiment in FIG. 1, the opening 18 is arranged at a longitudinal end of the envelope 3, at the wall 6, extending over the entire surface area of said wall 6. In addition, the plug 1 has a rigid cover 19 arranged on the longitudinal end of the envelope 3 comprising the opening 18 so as to close said opening 18. The rigid cover 19 may be fixed removably or securely to the envelope 3, for example by adhesive bonding. The envelope 3 and the rigid cover 19 may have cooperating shapes for assembling them.

Furthermore, the rigid cover 19 has a hole 20 through which the end 11 of the rod 9 passes. It also has an outer surface 21 which is oriented toward the outside of the envelope 3 and is able to serve as (direct or indirect) contact surface for pulling the rod 9.

The opening 18 thus makes it possible to easily inject the viscous seal 17 into the internal space 7, after which the rigid cover 19 can be installed on the envelope 3 in order to close it and keep the viscous seal in the internal space 7.

In a particular embodiment, shown in FIG. 1, the plug 1 has a non-return part 22 arranged on the rod 9 in the internal space 7 of the envelope 3. This non-return part 22 is configured to guide the viscous seal 17 out of the envelope 3 when the latter is deformed. It also makes it possible to prevent the viscous seal 17 from backing up into the internal space 7.

The non-return part 22 corresponds to a part of reduced thickness, such as a blade or a washer. It is arranged so as to extend radially with respect to the rod 9, preferably substantially perpendicularly in relation to said rod 9. As shown in FIG. 1, the non-return part 22 may be arranged so as to leave a free space between it and the wall 5 of the envelope 3.

The viscous seal 17 is arranged in a portion of the internal space 7 that is comprised between a face 23 of the non-return part 22 that faces the wall 6 and said wall 6 of the envelope 3. The face 23 comprises slopes 24 at its radially outer ends, having a shape designed to guide the viscous seal 17 toward the orifices 8 when the envelope 3 is deformed.

Moreover, the non-return part 22 is configured such that the face 23 covers substantially all of the radial cross section of the internal space 7. As a result, it prevents the viscous seal 17 from backing up into the internal space 7 (which is to say between the non-return part 22 and the wall 5) when the envelope 3 is deformed. This prevents a portion of the viscous seal 17 from being trapped in a possible bead formed by the deformed envelope 3.

Within the context of the present invention, the plug 1 as described above can be used to plug the cavity 2 by a process P, which is shown schematically in FIG. 7 and the steps of which are illustrated in FIG. 2A to FIG. 2D. To do this, the process P comprises at least steps E0, E1, E2 and E3, which are described below and implemented in succession.

Figures 2A, 2B, 2C, 2D:
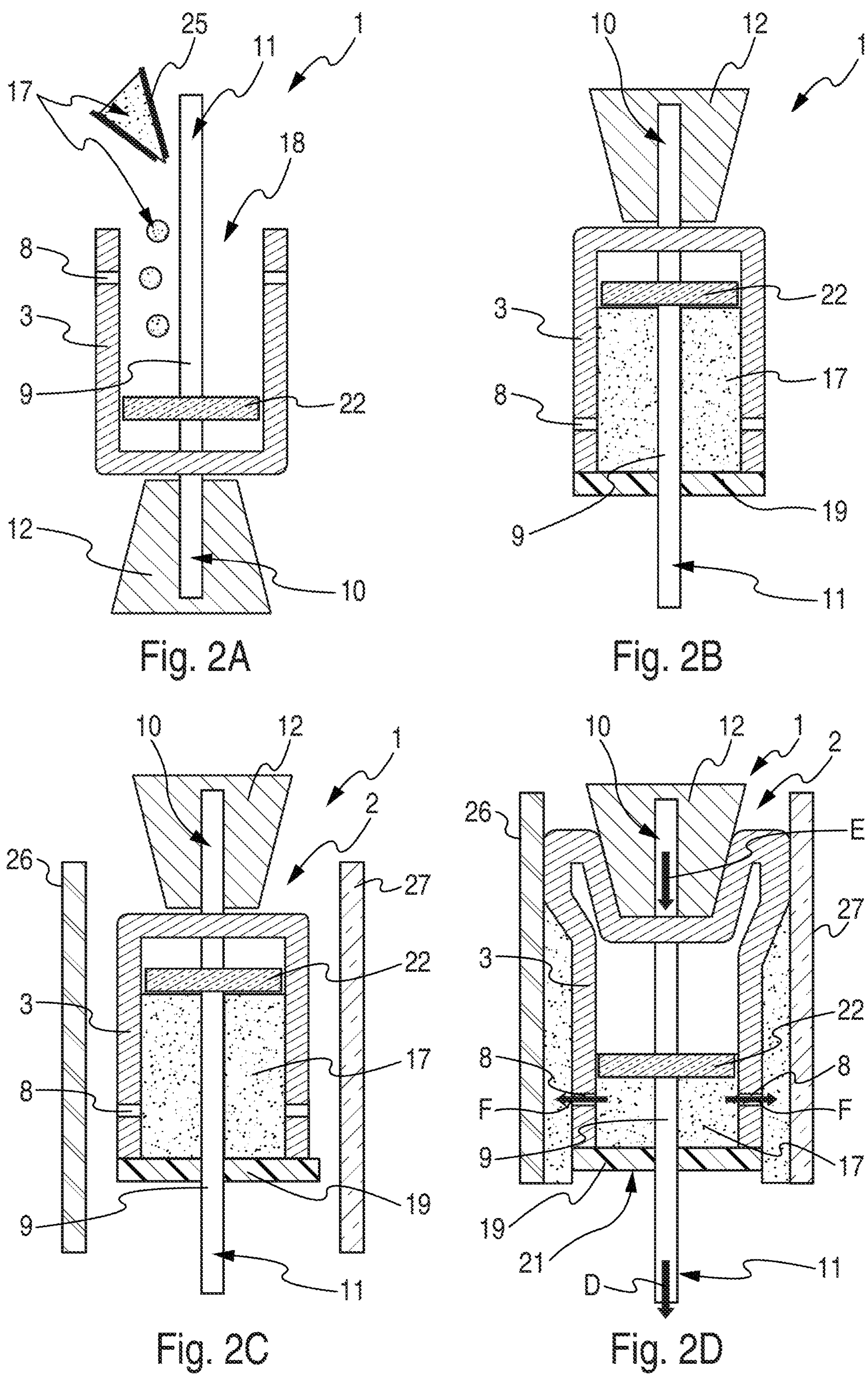
FIG. 2A is a view in section through the sealing plug in FIG. 1 during a preparation step for injecting a viscous seal into said sealing plug.
FIG. 2B is a view in section through the sealing plug in FIG. 2A once the preparation step is finished.
FIG. 2C is a view in section through the sealing plug in FIG. 2B, which is positioned in a cavity.
FIG. 2D is a view in section through the sealing plug in FIG. 2C, which is deformed so as to plug the cavity.
Figure 3:
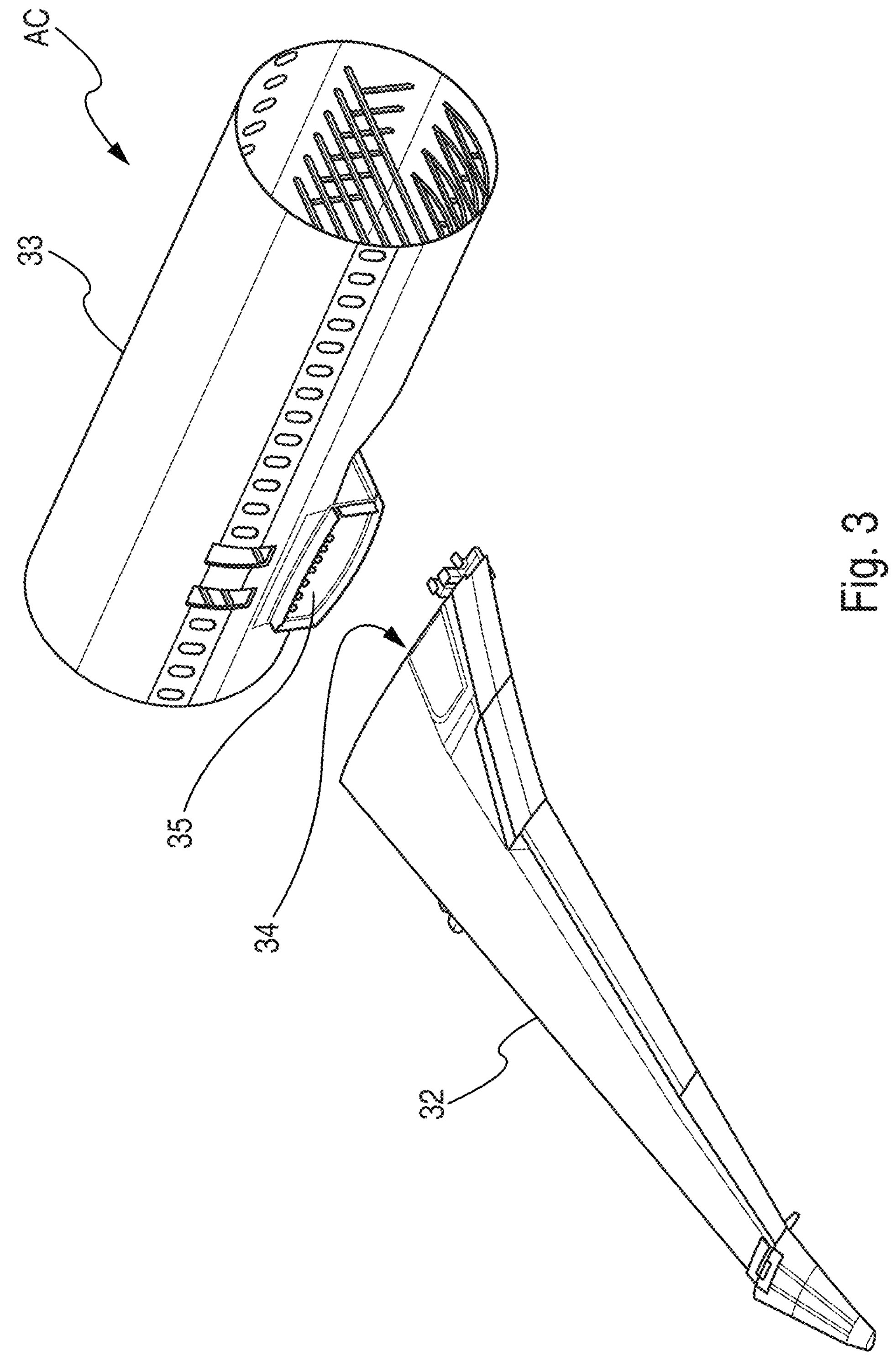
FIG. 3 is a partial exploded view of an aircraft showing the assembly of a wing box on a central box.

Step E0 is a preliminary step for assembling the plug 1 before it is inserted into the cavity 2. The viscous seal 17 is firstly prepared before being injected into the internal space 7 of the envelope 3 through the opening 18. As shown in FIG. 2A, the non-return part 22 is positioned in the internal space 7 and then the viscous seal 17 is injected on top of said non-return part 22 using a tool 25 such as a syringe or an injection gun.

Once the viscous seal 17 has been injected, the opening 18 is closed by the rigid cover 19, as shown in FIG. 2B. The rigid cover 19 is fixed to the envelope 3 firmly and leaktightly enough to withstand the compressive force exerted by the rod 9 that aims to deform the envelope 3 and such that the viscous seal 17 does not exit through the opening 18.

Once the plug 1 has been prepared, as shown in FIG. 2B, positioning step E1 is implemented in order to insert the plug 1 into the cavity 2. As shown in FIG. 2C, the plug 1 is inserted such that the end 11 of the rod 9 is accessible from the outside of the cavity 2 in order to be able to pull said rod 9.

In the particular embodiment in question (in FIG. 2A to FIG. 2D), the cavity 2 corresponds to a through-passage (which is to say that it is open at both of its ends) with a substantially rectangular cross section. Only two walls 26 and 27 of the cavity 2 are shown in FIG. 2C and FIG. 2D. In other embodiments, the cavity 2 may have other configurations; it may be blind, comprise multiple passages or else have a cross section which has a different shape and/or varies over the length of the cavity 2 (for example a conical cavity).

The plug 1 may be inserted via the most practical end of the cavity 2 for pulling the rod 9. In addition, it may be positioned wherever desired along the cavity 2, provided that its shape allows it.

To this end, the plug 1 is configured with a shape intended to cooperate with the walls of the cavity 2. "Cooperate" is understood to mean that the overall shape of the plug 1 (notably that of the envelope 3) approximately corresponds to and is slightly smaller than the shape of the cavity 2. As a result, the plug 1 can be inserted into the cavity 2 by sliding it in by hand. The shape of the plug 1 is preferably provided such that it is fitted to the cavity 2 by being in contact with the walls 26 and 27. For the sake of clarity, a gap between the non-deformed lateral wall 4 of the envelope 3 and the walls 26 and 27 of the cavity 2 is shown in a deliberately exaggerated view in FIG. 2C and FIG. 2D.

Once the plug 1 has been positioned in the cavity 2, deformation step E2 is implemented in order to deform the envelope 3. To do this, as shown by an arrow D in FIG. 2D, the rod 9 is moved by being pulled by the end 11 from outside the cavity 2. The rod 9 may be pulled manually or using a pulling tool (not shown) with a predefined pulling force. The rod 9 is preferably pulled while making contact with the contact surface 21 of the rigid cover 19 to avoid the plug 1 moving in the cavity 2 during step E2.

The end 11 may be pulled in the longitudinal direction of the rod 9. However, it may also be pulled in another direction. This may notably be the case if the cavity 2 is not straight or if there is an obstacle directly opposite the cavity 2, requiring the end 11 of the rod 9 to be curved.

The movement of the rod 9 causes the head 12 to move, and the head then exerts a compressive force on the envelope 3, shown by an arrow E in FIG. 2D. Under the effect of this compressive force, the envelope 3 is deformed and its walls are pushed back to either side of the head 12 while being pressed against the walls 26 and 27 of the cavity 2. The predefined pulling force is configured to deform the envelope 3 to a great enough extent that it plugs all or at least most of the cavity 2. Once it has deformed around the head 12, the envelope 3 is held in place in the cavity 2 by itself.

In addition, during step E2, the deformation of the envelope 3 and/or the movement of the non-return part 22 (caused by the movement of the rod 9) expels the viscous seal 17 from the envelope 3 through the orifices 8, as illustrated by two arrows F in FIG. 2D. The viscous seal 17 is then pressed between the walls of the envelope 3 and the walls of the cavity 2, thereby allowing it to expand throughout the space remaining between the plug 1 and the walls of the cavity 2, notably into small spaces that might form between the envelope 3 and the walls of the cavity 2 during step E2.

Once the envelope 3 has deformed so as to completely plug the cavity 2 with the viscous seal 17, polymerization step E3 is implemented in order to allow said viscous seal 17 to polymerize. The polymerization of the viscous seal 17 at ambient temperature makes it possible to complete the sealing of the cavity 2. In particular, it makes it possible to enhance the quality of the leaktightness and contributes to holding the plug 1 in place in the cavity 2.

As a result, carefully selecting the shape of the plug 1 (and notably that of the envelope 3) and its positioning in the cavity 2 makes it possible to obtain excellent leaktightness with less effort than a conventional sealing process involves. This is because the installation of the plug 1 requires access only on one side of the cavity and thus makes it possible to completely externalize the installation process. In addition, this sealing solution does not require any cleaning after installation and therefore reduces the associated workload.

In a particular embodiment, the process P comprises an intermediate step E4, implemented after step E1 and before step E2. This step E4 comprises placing an intermediate part 28 in the cavity 2, as shown in FIG. 6. This intermediate part 28 comprises a first end 29 configured to come into contact with the plug 1 and a second end 30 configured to protrude out of the cavity 2. The end 29 of the intermediate part 28 is preferably placed in contact with the contact surface 21 of the rigid cover 19. In addition, the end 30 of the intermediate part 28 is provided with a surface or face 31 capable of serving as a contact surface for pulling the rod 9.

The intermediate part 28 thus arranged, with the face 31 protruding out of the cavity 2, makes it possible to obtain an easily accessible contact surface for pulling the rod 9. This is particularly advantageous in configurations in which access to the cavity 2 is limited and/or when the pulling tool cannot be introduced as far as the plug 1 to make direct contact with the contact surface 21 of the rigid cover 19. The intermediate part 28 may, notably, have a particular shape, for example a curved shape, such that the face 31 protrudes out of the cavity 2 with a suitable orientation for pulling the rod 9.

A preferred application for the plug 1 is shown in FIG. 3 to FIG. 6. It concerns a junction zone between primary structures of a wing 32 and of a fuselage 33 of an aircraft AC (shown in part in FIG. 3). More particularly, it is a junction zone between a wing box 34 of the wing 32 and a central box 35 of the fuselage 33.

Figure 4:
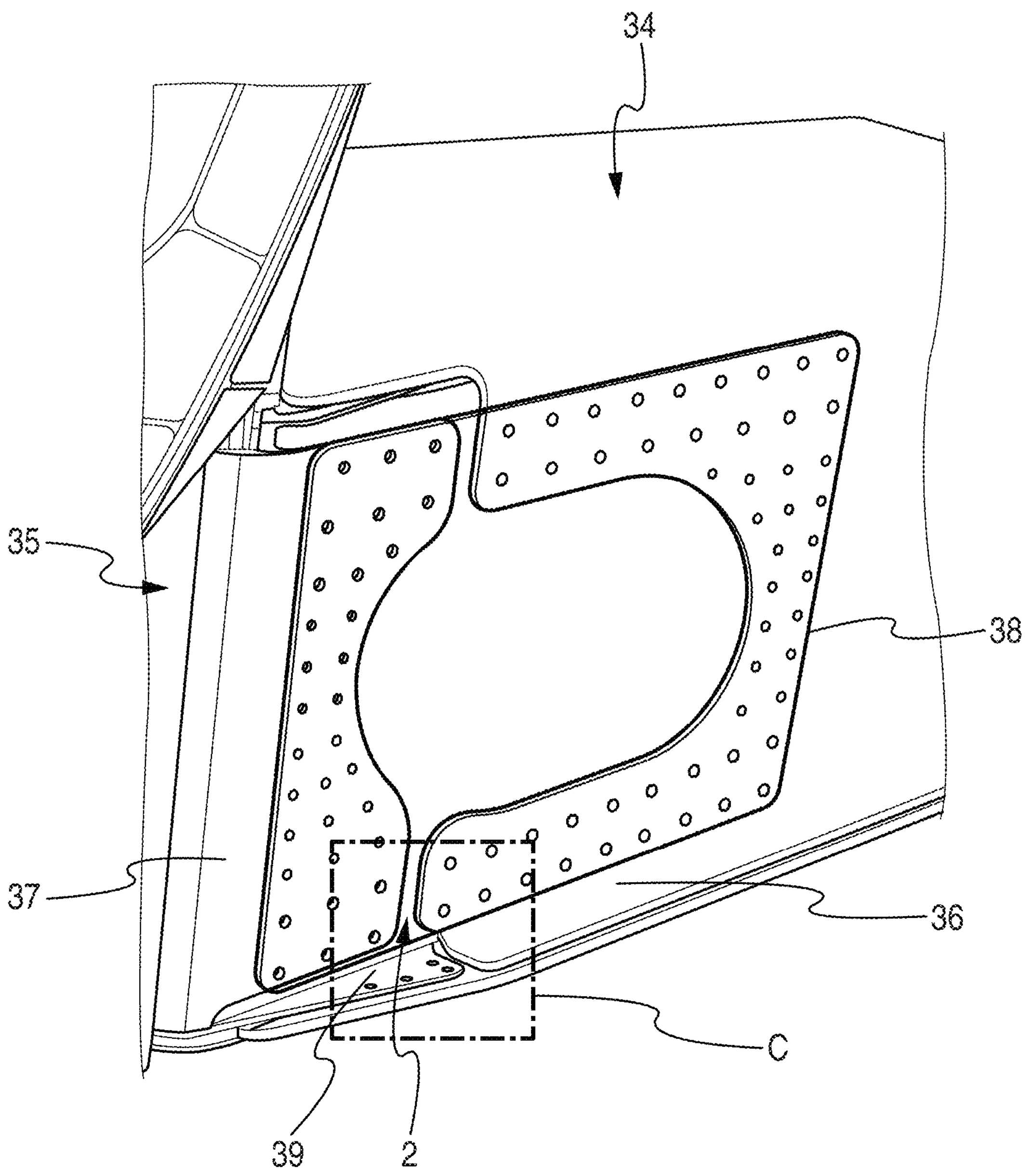
FIG. 4 is an enlarged view, in perspective, of a junction zone between the wing box and the central box in FIG. 3 comprising a cavity to be plugged.

As shown in FIG. 4, the assembly of the wing box 34 and the central box 35 involves a complex superposition of multiple panels made of metal or a composite material with particular shapes. In this assembly, a panel 36 of the wing box 34 is next to a panel 37 of the central box 35. The assembly tolerances mean that the panels 36 and 37 are spaced from one another, creating a space between them. In addition, a panel 38 is fixed on top of the panels 36 and 37, covering said space between them. The panel 38 is shown transparently in FIG. 4 in order to show the space at the interface between the panels 36 and 37.

The space between the panels 36 and 37 which is thus covered by the panel 38 forms a passage (or a chimney) of substantially rectangular cross section, shown in FIG. 4 in a square C. This passage formed between the panels 36, 37 and 38 corresponds to the cavity 2 to be plugged using the plug 1.

Figure 5:
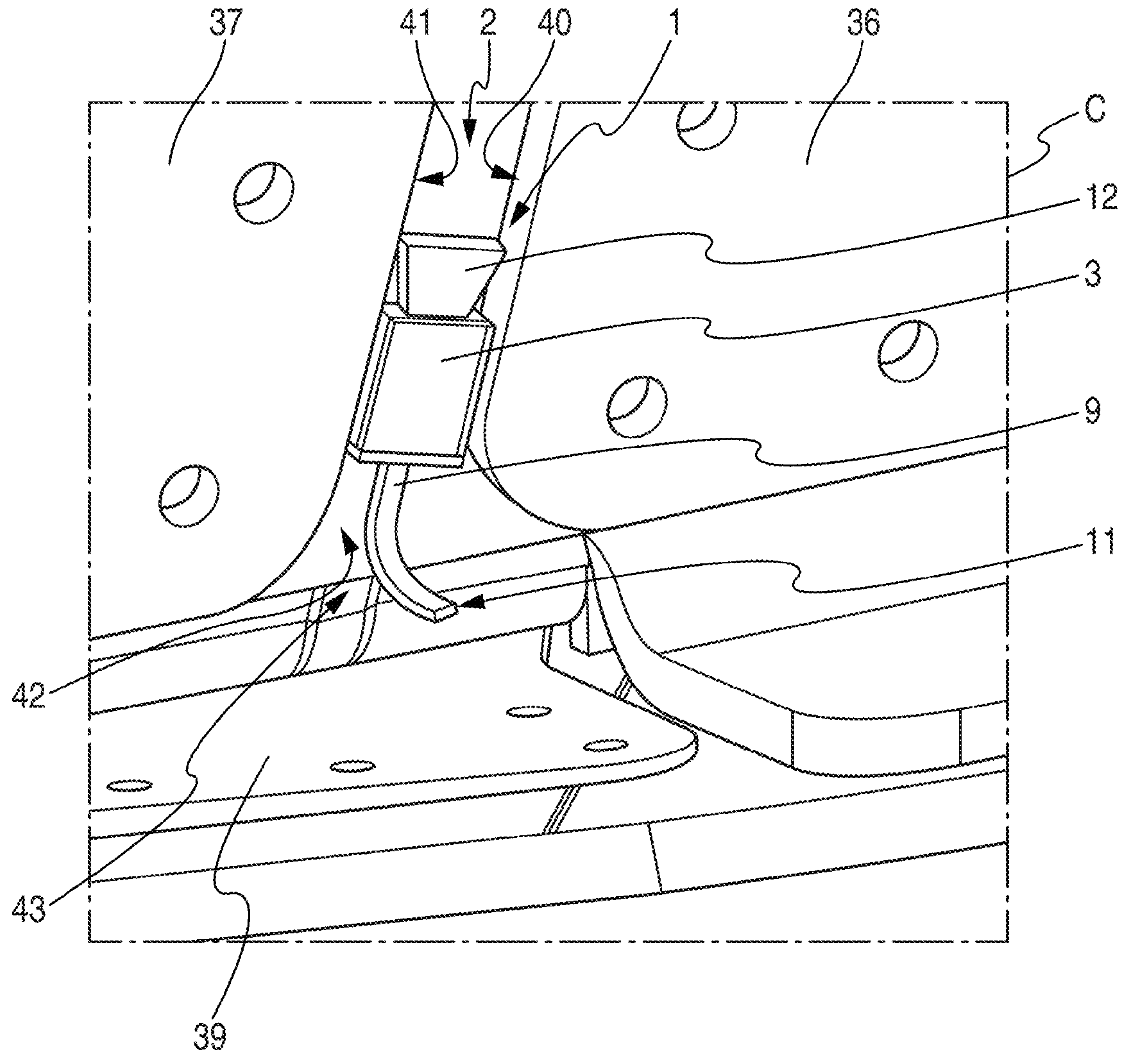
FIG. 5 is a perspective view of a sealing plug positioned in the cavity to be plugged in FIG. 4.
Figures 6, 7:
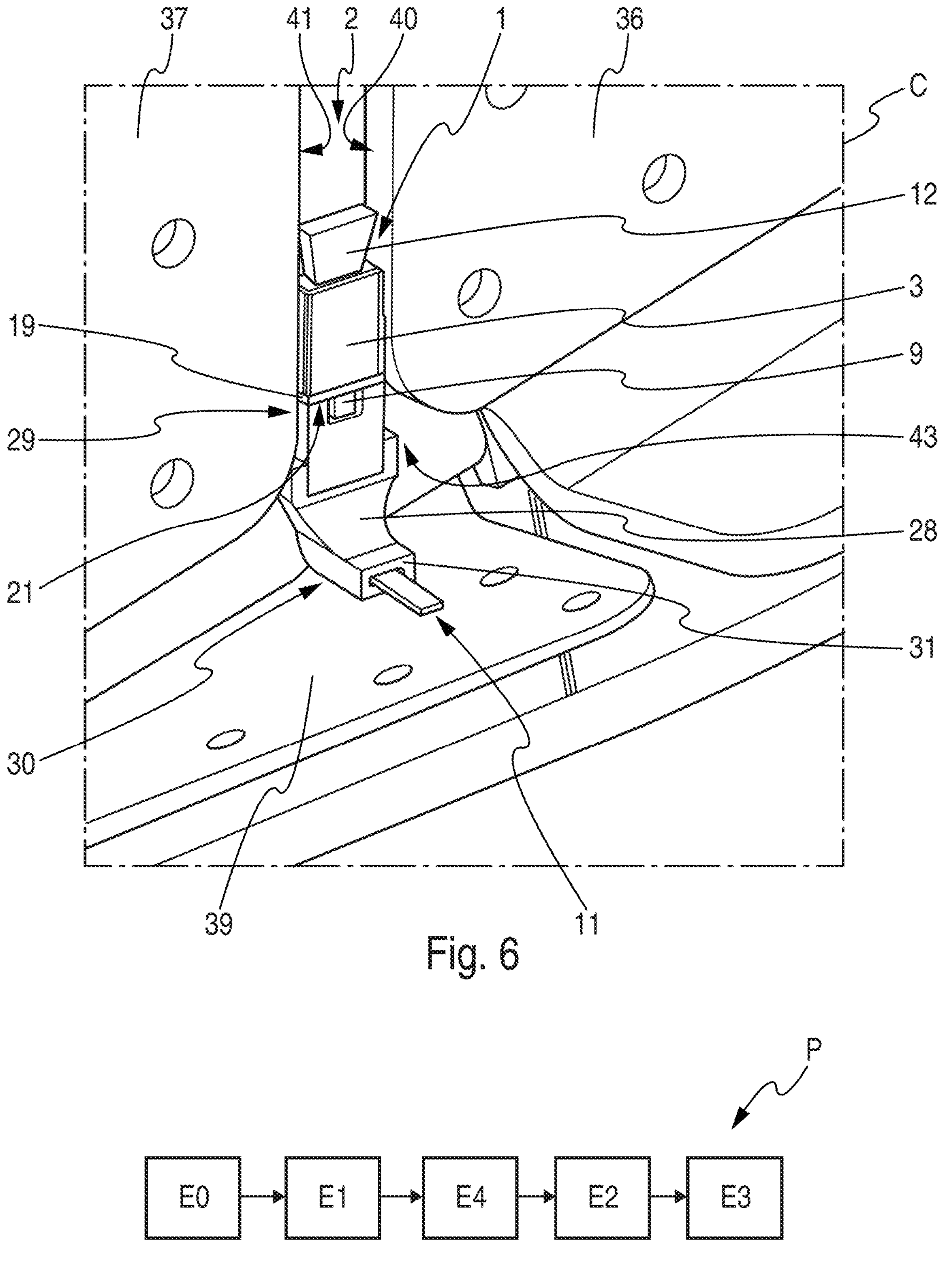
FIG. 6 is a perspective view of the sealing plug in FIG. 5 on which an intermediate part is arranged for a step of deforming said sealing plug.
FIG. 7 is a block diagram of a process for plugging a cavity using the sealing plug.

The zone framed by the square C is shown in an enlarged view in FIG. 5 and FIG. 6. As shown in detail in FIG. 5, the cavity 2 is delimited by faces 40, 41 and 42. The faces 40 and 41 correspond to edge faces of the panels 36 and 37, respectively, that face one another. The face 42 corresponds to a face of a rear panel (substantially parallel to the panel 38) that is arranged on the panels 36 and 37 from the inside of the wing box 34. A last face delimiting the cavity 2 corresponds to that face of the panel 38 that is arranged on the panels 36 and 37 from the outside of the wing box 34. For the sake of clarity, the panel 38 is not shown in FIG. 5 and FIG. 6.

In addition, the cavity 2 has, at one of its ends, an opening 43 leading out of the wing box 34 opposite a bracket 39. At its other end (not shown), the cavity 2 leads out into the wing box 34.

In this preferred application, as shown in FIG. 5, the plug 1 is positioned in the cavity 2 in the vicinity of the opening 43. This is because a space between the bracket 39 and the opening 43 makes it possible to insert the plug 1, if required, by bending it (by virtue of its flexible overall structure). The end of the plug 1 comprising the head 12 points into the cavity 2 and the end comprising the end 11 to be pulled points toward the opening 43. The rod 9 is provided with a suitable length for projecting out of the cavity 2.

As shown in FIG. 6, the intermediate part 28 is arranged in the cavity 2 in contact with the plug 1. More specifically, the end 29 of the intermediate part 28 is inserted into the cavity 2 until it comes into contact with the contact surface 21 of the rigid cover 19. The intermediate part 28 has a length which is suitable for its end 30 to project out of the cavity 2 when the end 29 is in contact with the plug 1. In addition, the intermediate part 28 has a curved shape such that the face 31 protrudes out of the cavity 2, substantially perpendicularly in relation to the latter.

The intermediate part 28 thus positioned makes it possible to easily use the pulling tool (not shown) to pull the end 11 of the rod 9. This is because the intermediate part 28 is configured such that the end 11 of the rod 9 can pass through the intermediate part 28 so as to lead out at the face 31. The pulling tool is then placed in contact with the face 31 from outside the cavity 2 in order to pull the projecting end 11 with a predefined force that can be selected by an operator. This predefined force makes it possible to deform the plug 1 as described above so as to plug the cavity 2. Once the rod 9 has been pulled and the plug 1 has deformed, the intermediate part 28 is removed and the end 11 of the rod 9 is cut.

The plug 1 as described above has numerous advantages. In particular:

- it makes it possible to easily plug a cavity 2 leaktightly, since it can be inserted easily into the cavity 2 and deformed from the outside without causing any problems of accessibility;
- it can be put in place quickly and makes it possible to limit the steps of preparing the cavity 2;
- it is inexpensive and makes it possible to limit the labor costs;
- it can easily be adapted to plug cavities of various shapes and/or sizes;
- it can be put in place using a compact tool, since it does not require a significant injection pressure;
- it can be positioned precisely at a desired location in the cavity 2; and
- it makes it possible to obtain excellent leaktightness by virtue of the combination of the deformable envelope 3 and the viscous seal 17.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A sealing plug configured to be arranged inside a cavity in order to plug said cavity leaktightly, the sealing plug comprising:

- an envelope configured to be deformed incompressibly, the envelope delimiting a hollow internal space and being provided with at least one orifice capable of making said hollow internal space communicate with an outside of the envelope;
- a rod which is configured to slide through the envelope and extend on either side of said envelope, the rod comprising a first end provided with a head configured to exert a compressive force on the envelope in order to deform the envelope when a second end of the rod is moved so as to pull the head against the envelope;
- a viscous seal arranged in the hollow internal space of the envelope; and
- a non-return part arranged on the rod, in the hollow internal space of the envelope and extending transversely with respect to the rod, the non-return part being configured to guide the viscous seal toward the at least one orifice in the envelope when said envelope is deformed, and to prevent the viscous seal from backing up into the hollow internal space, and
- wherein the sealing plug is configured such that the viscous seal is at least partially expelled from the envelope through the at least one orifice when the envelope is deformed by the head of the rod.

2. The sealing plug as claimed in claim 1, wherein the head of the rod has a trapezoidal shape, the head being arranged such that a small base of the trapezoidal shape is configured to contact with the envelope when the second end of the rod is moved so as to pull the head against said envelope.

3. The sealing plug as claimed in claim 1, wherein the envelope is provided with an opening for accessing the internal space, and wherein the sealing plug further comprises:

- a rigid cover configured to close said opening.

4. The sealing plug as claimed in claim 1, wherein the viscous seal comprises a sealant mastic which is polymerizable at ambient temperature.

5. The sealing plug as claimed in claim 1, wherein the envelope has an elongate parallelepipedal shape comprising a lateral wall in which the at least one orifice is provided and comprising a wall at each longitudinal end, between which the rod extends and through which the rod passes, the head of the rod configured to contact with one of said walls so as to deform the envelope.

6. A structure comprising:

- at least one cavity, and,
- the sealing plug as claimed in claim 1, the sealing plug arranged in the at least one cavity so as to plug said at least one cavity leaktightly.

* * * * *